US010369693B1

(12) United States Patent
Levine et al.

(10) Patent No.: US 10,369,693 B1
(45) Date of Patent: Aug. 6, 2019

(54) CABLE SUSPENDED ROBOTIC SYSTEM

(71) Applicant: X Development LLC, Mountain View, CA (US)

(72) Inventors: Gabriella Levine, San Francisco, CA (US); Mitchell Heinrich, Oakland, CA (US)

(73) Assignee: X Development LLC, Mountain View, CA (US)

( * ) Notice: Subject to any disclaimer, the term of this patent is extended or adjusted under 35 U.S.C. 154(b) by 215 days.

(21) Appl. No.: 15/348,013

(22) Filed: Nov. 10, 2016

(51) Int. Cl.
| B25J 9/10 | (2006.01) |
| F16M 13/00 | (2006.01) |
| A01C 7/08 | (2006.01) |
| B25J 9/16 | (2006.01) |
| F16M 13/02 | (2006.01) |

(52) U.S. Cl.
CPC ............... B25J 9/104 (2013.01); A01C 7/085 (2013.01); B25J 9/1666 (2013.01); F16M 13/022 (2013.01)

(58) Field of Classification Search
CPC ... B25J 9/104; B25J 9/1666; B25J 5/00; B25J 9/0009; B25J 9/0078; B25J 9/10; B25J 9/1615; B25J 9/1676; A01C 7/085; F16M 13/022; G05B 19/4061; G05B 2219/40273; G05B 2219/40317; G05B 2219/40323; G05B 2219/40255
USPC .............................................. 700/255; 703/7
See application file for complete search history.

(56) References Cited

U.S. PATENT DOCUMENTS

| 3,635,004 | A | 1/1972 | Webb |
| 4,212,148 | A | 7/1980 | Brownlee |
| 4,777,787 | A | 10/1988 | Warren |
| 6,009,186 | A | 12/1999 | Gorretta |
| 6,151,876 | A | 11/2000 | Van Der Burg |
| 6,873,355 | B1 | 3/2005 | Thompson |

(Continued)

FOREIGN PATENT DOCUMENTS

| CN | 102835264 | 12/2012 |
| WO | WO-9422067 | 9/1994 |

(Continued)

OTHER PUBLICATIONS

'www.asme.org' [online] "Constructing the Future with Flying Robots," Feb. 2016, [retrieved on Feb. 15, 2017] Retrieved from Internet: URL<https://www.asme.org/engineering-topics/articles/technology-and-society/constructing-future-with-flying-robots> 3 pages.

(Continued)

*Primary Examiner* — Bao Long T Nguyen
(74) *Attorney, Agent, or Firm* — Fish & Richardson P.C.

(57) ABSTRACT

Methods, systems, and apparatus, including computer programs encoded on a computer storage medium, for obtaining a three-dimensional (3D) model of an operating volume for a cable-suspended robotic system, where the operating volume is defined, at least in part, by a plurality of cable support structures. Identifying a cable positioned device suspended from a plurality of cables and an object that obstructs a path of the cable positioned device within the operating volume within the 3D model. Locating the cable positioned device relative to the object using the 3D model. Controlling one or more cable motors to navigate the cable positioned device within the operating volume.

20 Claims, 5 Drawing Sheets

(56) References Cited

U.S. PATENT DOCUMENTS

| | | | |
|---|---|---|---|
| 6,975,089 B2 | 12/2005 | Rodnunsky | |
| 7,088,071 B2 | 8/2006 | Rodnunsky | |
| 7,765,780 B2 | 8/2010 | Koselka et al. | |
| 7,854,108 B2 | 12/2010 | Koselka et al. | |
| 8,199,197 B2 * | 6/2012 | Bennett | F16M 11/105 348/144 |
| 8,909,379 B2 * | 12/2014 | Fisher | B66C 21/00 472/80 |
| 9,063,390 B2 | 6/2015 | Wharton | |
| 9,532,508 B1 | 1/2017 | Stubbs | |
| 2003/0106258 A1 | 6/2003 | Keller | |
| 2004/0206715 A1 | 10/2004 | Rodnunsky | |
| 2005/0024331 A1 * | 2/2005 | Berkley | G06F 3/016 345/161 |
| 2005/0126144 A1 | 6/2005 | Koselka | |
| 2005/0224438 A1 | 10/2005 | Maurer | |
| 2006/0213167 A1 | 9/2006 | Koselka | |
| 2008/0010961 A1 | 1/2008 | Gray | |
| 2009/0066100 A1 | 3/2009 | Bosscher | |
| 2011/0022231 A1 | 1/2011 | Walker | |
| 2013/0292543 A1 | 11/2013 | Kim | |
| 2013/0345876 A1 * | 12/2013 | Rudakevych | B25J 9/1697 700/259 |
| 2014/0303814 A1 | 10/2014 | Burema | |
| 2014/0311014 A1 | 10/2014 | Feugier | |
| 2015/0237791 A1 | 8/2015 | Bassett et al. | |
| 2016/0353661 A1 | 12/2016 | Caldeira | |
| 2017/0094889 A1 | 4/2017 | Garner | |

FOREIGN PATENT DOCUMENTS

| | | |
|---|---|---|
| WO | 2015/164802 | 10/2015 |
| WO | 2015/191556 | 12/2015 |

OTHER PUBLICATIONS

'www.ditogear.com' [online] "Introducing DitoGear OmniSlider Servo and V2 firmware for OmniSlider," [retrieved on Feb. 15, 2017] Retrieved from Internet: URL<http://ditogear.com/news/2011-august-news/> 5 pages.

'www.electronics.howstuffworks.com' [online] "How Skycam Works," [retrieved on Feb. 15, 2017] Retrieved from Internet: URL<http://electronics.howstuffworks.com/cameras-photography/digital/skycam.htm> 9 pages.

'www.iri.upc.edu' [online] "Path Planning for cable-driven robots," [retrieved on Feb. 15, 2017] Retrieved from Internet: URL<http://www.iri.upc.edu/people/ros/CableDriven/> 4 pages.

'www.nist.gov' [online] "Remote Graphic Programming and Monitoring Tools of the NIST RoboCrane?," Sep. 29, 1997, [retrieved on Feb. 15, 2017] Retrieved from Internet: URL<https://www.nist.gov/node/703411>.

'www.nist.gov' [online] "Robocrane: Summary" [retrieved on Feb. 15, 2017] Retrieved from Internet: URL<https://www.nist.gov/programs-projects/robocrane> 3 pages.

'www.nist.gov' [online] "Summary of Modeling and Simulation for NIST RoboCrane?," Oct. 1, 1997 [retrieved on Feb. 15, 2017] Retrieved from Internet URL<https://www.nist.gov/node/703081>.

'www.skycam.tv' [online] "SkyCam the World's Premier Aerial Camera Platform: What is SkyCam," [retrieved on Feb. 15, 2017] Retrieved from Internet: URL<http://skycam.tv.s28625.gridserver.com/sample-page-2/features/> 1 page.

'www.spectrum.ieee.org' [online] "The r3 Rope Robot," Sep. 27, 2010, [retrieved on Feb. 15, 2017] Retrieved from Internet: URL<http://spectrum.ieee.org/automaton/robotics/medical-robots/eth-zurich-r3-rope-robot> 6 pages.

* cited by examiner

CABLE SUSPENDED ROBOTIC SYSTEM

TECHNICAL FIELD

This disclosure generally relates to robotics, and more particularly to cable robots that include a cable positioned robotic device suspended from a set of cables and respective support structures.

BACKGROUND

Many robotic systems, such as autonomous vehicles, are restricted to operations in two dimensions. This limits the type of tasks that such systems can perform or the environments in which the systems can operate. Other systems, such as drones, can operate in three dimensions, but their operations are limited by carrying capacity.

SUMMARY

This disclosure describes systems, methods, devices, and other techniques for controlling and operating cable-suspended robotic systems. In general, this disclosure describes systems, methods, devices, and other techniques for operating cable-suspended robotic systems within a three-dimensional region. The robotic systems discussed herein include a cable positioned device (CPD) suspended from a cable positioning system. The cable positioning system includes a plurality of cable support structures that support a network of suspension cables to which the CPD is attached. Each support structure includes cable control equipment for controlling an operating length of one of the suspension cables. The cable positioning system also includes a plurality of sensors for mapping the operating volume and monitoring the operation of the CPD within the operating volume. The operating length of each suspension cable can be independently adjusted to maneuver the CPD within the operating volume. More specifically, the cable positioning system can move the CPD in three-dimensions within the operating volume by independently controlling one or more support structures' cable control equipment to pay-out or reel-in one or more of the cables from which the CPD is suspended.

In general, innovative aspects of the subject matter described in this specification can be embodied in methods that include the actions of obtaining a three-dimensional (3D) model of an operating volume for a cable-suspended robotic system, where the operating volume is defined, at least in part, by a plurality of cable support structures. Identifying a cable positioned device suspended from a plurality of cables and an object that obstructs a path of the cable positioned device within the operating volume within the 3D model. Locating the cable positioned device relative to the object using the 3D model. Controlling one or more cable motors to navigate the cable positioned device within the operating volume. Other implementations of this aspect include corresponding systems, apparatus, and computer programs, configured to perform the actions of the methods, encoded on computer storage devices. These and other implementations can each optionally include one or more of the following features.

In some implementations, controlling one or more cable motors to navigate the cable positioned device within the operating volume includes controlling one or more cable motors to navigate the cable positioned device within the operating volume while avoiding a collision between the cable positioned device and the object.

In some implementations, controlling one or more cable motors to navigate the cable positioned device within the operating volume includes controlling one or more cable motors to navigate the cable positioned device within the operating volume while avoiding a collision between at least one of the plurality of cables and the object.

In some implementations, the process includes determining a position of the cables based on a position of the cable positioned device.

In some implementations, obtaining the 3D model includes generating a 3D model of an operating volume based on sensor data of the operating volume. In some implementations, the sensor data can include images of the operating volume or ranging data of ranges between the cable support structures.

In some implementations, obtaining the 3D model includes generating a 3D model of an operating volume based on images of the operating volume.

In some implementations, obtaining the 3D model includes generating a 3D model of an operating volume based on ranging data of ranges between the cable support structures.

In some implementations, controlling the one or more cable motors to navigate the cable positioned device includes determining a path through the operating volume to perform an operation with the cable positioned device.

In some implementations, the process includes determining that the path for the cable positioned device will result in collision with the object, and modifying the path of the cable positioned device to avoid the object, where a modified path is generated.

In some implementations, controlling the one or more cable motors to navigate the cable positioned device includes controlling the one or more cable motors to navigate the cable positioned device along the modified path to perform an action with the cable positioned device.

In some implementations, the cable support structures are mobile cable support structures that can be controlled to move independently of each other to reconfigure the 3D operating volume, and the process includes obtaining a second 3D model of the operating volume in response to at least one of the cable support structures having been moved.

In some implementations, the operation volume is defined by the relative positions of the cable support structures and operational limits of the cable-suspended robotic system.

In some implementations, lateral dimensions of the operating volume are defined by relative positions of the cable support structures and vertical dimensions of the operating volume are defined by operational constraints of the cables.

In some implementations, obtaining the 3D model includes loading a previously generated 3D model of the operating volume.

In some implementations, the process includes detecting a user input to move the cable positioned device to a new location based on receiving data indicating changes in tension in one or more of the plurality of cables.

In a second aspect, the subject matter described in this specification can be embodied in a cable-suspended robotic system that includes a plurality of cable support structures, a plurality of spools of deployable cable, a plurality of spool motors, a cable positioned device coupled to one end of each of the cables, and a control system. At least one of the spools is associated with each of the plurality of cable support structures such that cable from each spool is supported by a respective cable support structure. At least one spool motor is coupled to each spool of deployable cable and each motor is coupled to a respective motor controller. The control system is in communication with the motor controllers. The control system includes one or more processors and a data store coupled to the one or more processors having instructions stored thereon which, when executed by the one or more processors, causes the one or more processors to perform the following operations. Identifying a three dimensional (3D) operating volume for the cable positioned device by determining the position of each of the plurality of cable support structures relative to others of the plurality of cable support structures. Controlling the motors to navigate the cable positioned device within the 3D operating volume. This and other implementations can each optionally include one or more of the following features.

In some implementations, the cable support structures are mobile cable support structures that can be controlled to move independently of each other to reconfigure the 3D operating volume.

In some implementations, the cable positioned device includes an actuator, a claw, a camera, a gondola, or seed spreading device.

In some implementations, at least one of the plurality of cable support structures includes a propulsion system.

In some implementations, at least one of the plurality of cable support structures is mounted on a wall of a building.

In some implementations, at least one of the cable support structures is height adjustable.

In some implementations, the operations include controlling at least one of the plurality of cable support structures to change the position of the at least one of the plurality of cable support structures relative to the others of the plurality of cable support structures, and identifying a new 3D operating volume for the cable positioned device.

In some implementations, the system includes a cross-member between at least two of the cable support structures.

Particular implementations of the subject matter described in this specification can be implemented so as to realize one or more of the following advantages. Implementations provide processes for automatically detecting and avoiding objects with a cable suspended device and the cables used to control the device. Implementations may provide mobility and modularity for a cable-suspended robotic system. Implementations may require less infrastructure than present methods used to complete similar tasks, e.g., due to the mobility and modularity of some implementations. Implementations may have small footprint or low power requirements.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

In general, this disclosure describes systems, methods, devices, and other techniques for operating cable-suspended robotic systems with in a three-dimensional region or "operating volume." The robotic systems discussed herein include a cable positioned device (CPD) suspended from a cable positioning system. The cable positioning system includes a plurality of cable support structures that support a network of suspension cables to which the CPD is attached. Each support structure includes cable control equipment for controlling an operating length of one of the suspension cables. The cable positioning system also includes a plurality of sensors for mapping the operating volume and monitoring the operation of the CPD within the operating volume. The operating length of each suspension cable can be independently adjusted to maneuver the CPD within the operating volume. More specifically, the cable positioning system can move the CPD in three-dimensions within the operating volume by independently controlling one or more support structures' cable control equipment to pay-out or reel-in one or more of the cables from which the CPD is suspended.

Figure 1A:
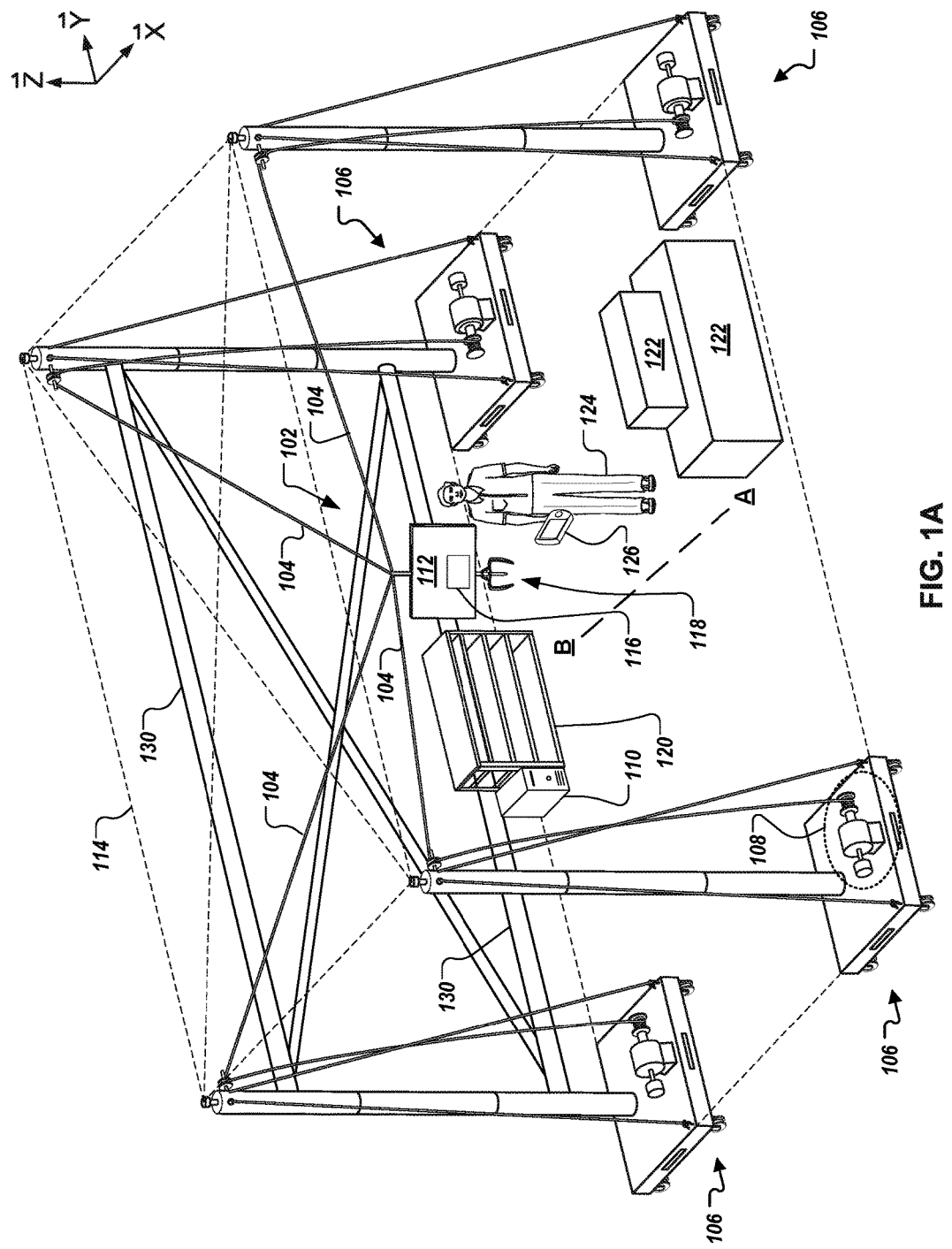
FIG. 1A depicts an example cable-suspended robotic system.

FIG. 1A depicts an example cable-suspended robotic system 100. The system 100 includes a network 102 of cables 104 supported by a plurality of support structures 106. Each support structure 106 includes cable control equipment 108 which is controlled by a computerized control system 110. Together, the support structures 106 and control system 110 form a cable positioning system for a CPD 112 that is suspended from the cables 104. The control system 110 controls the cable control equipment 108 of each support structure 106 to maneuver the CPD 112 in three dimensions within the operating volume 114.

The CPD 112 is an electro-mechanical module that is used to perform particular operations of the cable-suspended robotic system 100. The CPD 112 can, itself, be a robotic device. For example, the CPD 112 can be a lifting device (e.g., a claw), a camera system, a gondola, a seed spreading device, or an applicator device (e.g., paint sprayer, fertilizer applicator, or a combination thereof). The CPD 112 can include sensors 116 and a mechanical actuator 118 (e.g., claw, gondola, spreading device, applicator, or a combination thereof) for performing various functions. In some implementations, the CPD 112 can include an actuator to raise, lower, turn or otherwise physically manipulate, the CPD 112 (e.g., a winch). The sensors 116 can include cameras and/or ranging sensors (e.g., laser or radar ranging sensors). The CPD 112 can include a control processor configured to control operations of the CPD 112. The CPD 112 is in electronic communication with the control system 110. For example, the CPD 112 can communicate with the control system 110 through a wired communication path such as a wire running along one or more of the cables 104 to the control system 110, a communication wire integrated with the mechanical support cables 104, or a wireless communication link such as a wireless network (e.g., WiFi, Bluetooth, etc.) or a cellular network (e.g., 4G, LTE, or a combination thereof). The CPD 112 transmits status information and sensor data to the control system 110, which the control system 110 can use to maneuver the CPD 112 around the operating volume 114.

The support structures 106 provide both structural support and mechanical control of the cable network 102. The relative locations of the support structures 106 with respect to each other can be used to define the operating volume 114. For example, as illustrated in FIG. 1A, the lateral and longitudinal dimensions, x- and y-dimensions, of the operating volume 114 for the cable positioning system are defined by the locations of the support structures 106. The height, z-dimension, of the operating volume 114 is defined by the height of the support structures 106. In other words, for a particular arrangement of support structures 106, the cable positioning system cannot move the CPD 112 into a location outside of the operating volume 114 without moving the support structures 106. The operating volume 114 may be further limited, in some implementations, by structural and/or operational constraints related to one or more of the support structures 106, the cables 104, the operating equipment 108, and the CPD 112. For example, the maximum height at which the CPD 112 may be operated may be limited to less than the height of the operating volume 114 due to the structural strength of the cables 104 and the weight of the CPD 112. As another example, various positions within the operating volume 114 may produce different mechanical stresses on the cables 104 and support structures. For example, the cables 104 may be under greater mechanical stresses as the angle between the cables 104 and the support structure 106 approaches 90 degrees, thus, limiting the maximum height of the CPD 112.

Figure 1B:
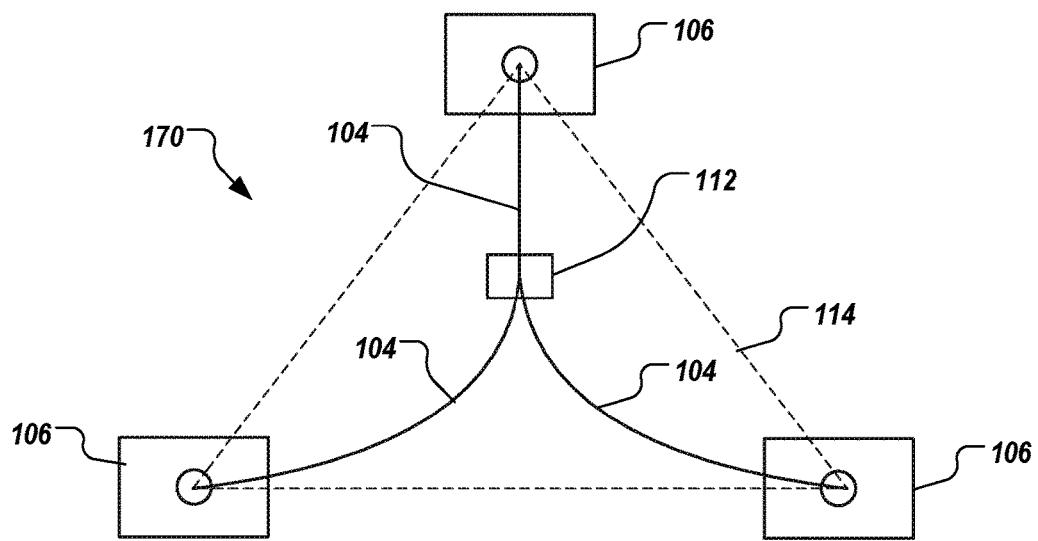
FIGS. 1B and 1C depict top views of example geometries for example cable-suspended robotic systems.
Figure 1C:
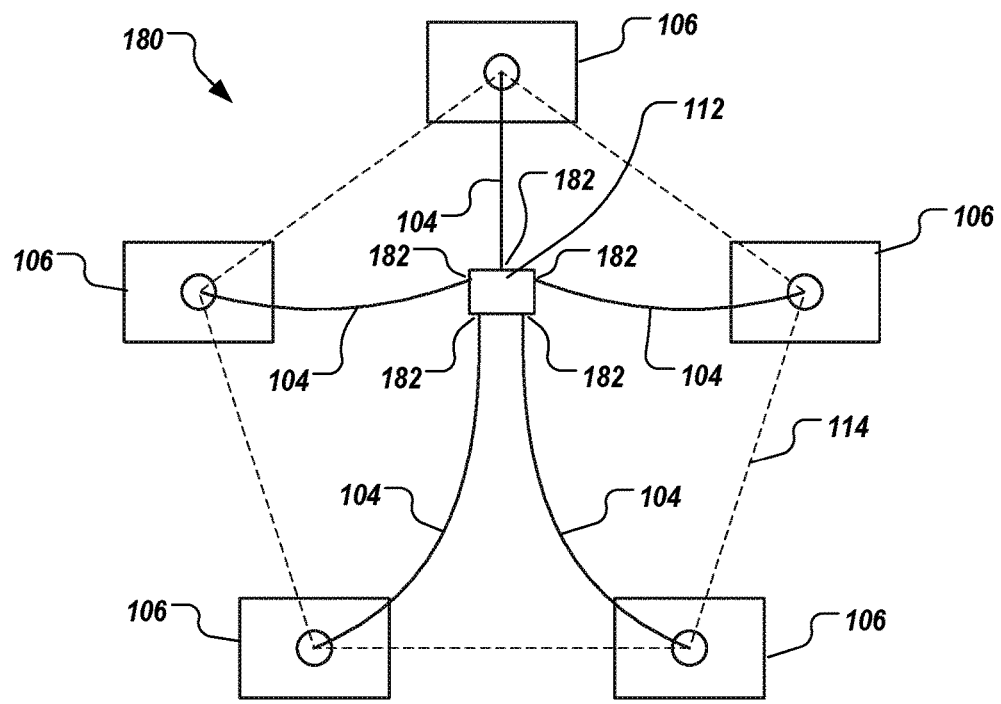

FIGS. 1B and 1C illustrate top-views of additional example support structure 106 configurations that define different operating volumes 114. FIG. 1B illustrates an example configuration 170 of three support structures 106 that forms a three-sided operating volume 114 when viewed from above. FIG. 1C illustrates an example configuration 180 of five support structures 106 that forms a five-sided polygonal operating volume 114. The support structures 106 in either configuration 170 or 180 need not be equidistant from each other and need not form regular geometric shapes (e.g., the triangle or pentagon as shown). In some implementations, the cables 104 can be connected to cable connection points 182 at or near the periphery of the CPD 112. Such connections may improve the stability of the CPD 112, for example, by reducing the tendency of the CPD 112 to rotate during operation. Cable connections points 182 at the periphery of the CPD 112 may provide even more stability in implementations that include four or more cables 104 connected to the CPD 112.

Figure 2:
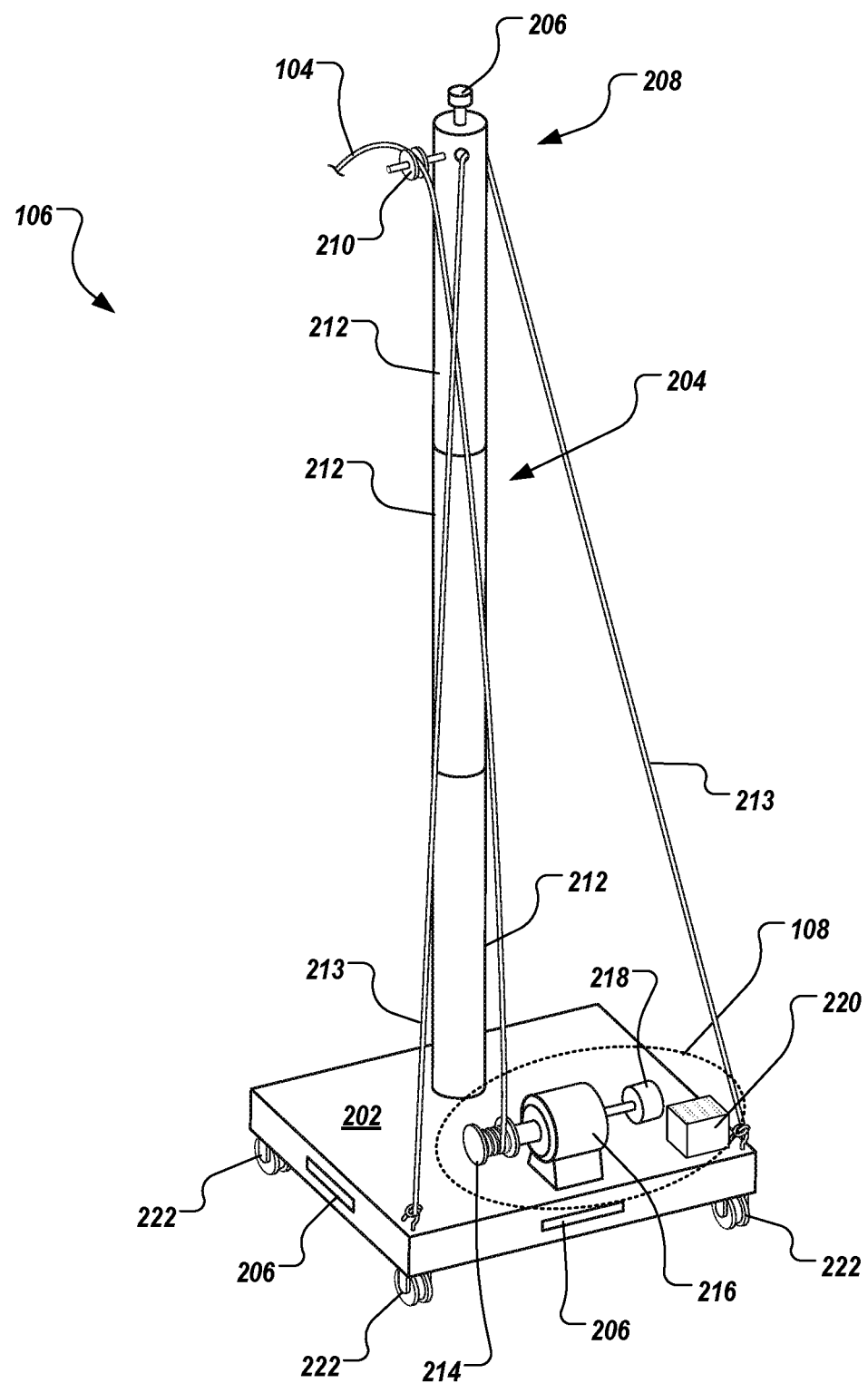
FIG. 2 depicts an example cable support structure for a cable-suspended robotic system.

Moreover, as illustrated in FIGS. 1A and 2, the support structures 106 can be independent units that are part of a modular cable-suspended robotic system 100. Referring to FIGS. 1A and 2, the support structures 106 include a base unit 202, a cable support 204, cable control equipment 108, and sensors 206.

The cable support 204 is mounted on the base unit 202. The cable support 204 provides structural support to a cable 104 extending from the cable control equipment 108 to the CPD 112. The cable 104 is supported by the upper end 208 of the cable support 204, for example, by a pulley 210 or other similar device. In some implementations, the cable support 204 can be height adjustable. For example, the cable support 204 can be extendible and retractable. In such implementations, the cable support 204 can include a plurality of telescoping segments 212. Adjusting the height of the cable support 204 may also serve to adjust the height of the operating volume 114 (e.g., the z-axis dimension of the operating volume 114).

The cable support 204 can, optionally, include one or more stabilizers 213. The stabilizers 213 can be, for example, cables, beams, ropes, or a combination thereof. The stabilizers 213 may provide additional structural support to the cable support 204.

The cable control equipment 108 includes, but is not limited to, a cable spool 214, a motor 216 operationally coupled to the spool 214, and an equipment controller 218. The motor 216 can be an electric motor (e.g., a servo motor or stepper motor) or hydraulic motor. The control equipment 108 can, optionally, include a power supply 220. The equipment controller 218 is an electronic device that is configured to interface with the control system 110 and control the operation of the motor 216 to adjust the length of a cable 104 attached to the spool 214. The equipment controller 218 controls the length of a cable 104 by controlling the motor 216 to rotate the spool 214 and real-in or pay-out the cable 104, which in turn, changes the position of the CPD 112 within the operating volume 114. The equipment controller 218 can include a communication interface for communicating with the control system 110. The equipment controller 218 can include a motor controller for controlling operations of the motor 216.

The power supply 220 can be an independent power supply that provides power to the control equipment 108 and the sensors 206 on the support structure 106. The power supply can include, but is not limited to, external AC power, a solar power supply, a generator (e.g., a gasoline or diesel generator), one or more batteries, or a combination of different power supplies (e.g., a solar power supply and batteries).

The sensors 206 can include, but are not limited to, optical sensors (e.g., still or video cameras), ranging sensors (e.g., laser or radar range detectors), radar sensors, ultrasonic sensors, infrared sensors, pressure sensors, force sensing resistors (FSR), or a combination thereof. The sensors 206 acquire information about the operational volume 114 and transmit sensor data to the control system 110. The sensors 206 can transmit the received information to the control system 110 through the equipment controller 218 or directly to the control system 110. That is, in some implementations, the equipment controller 218 can aggregate sensors data from one or more of the sensors 206 associated with a support structure 106 and send the data to the to the control system 110. The sensor data can include, but is not limited to, data related to the relative locations of other support structures 106, e.g., range data, which the control system 110 can use to determine boundaries of the operating volume 114; data related to obstacles, e.g., locations of obstacles such as shelf 120, boxes 122, and user 124 within the operating area 114.

In some implementations, the base unit 202 of one or more support structures 106 can be mobile. For example, the base unit 202 can include wheels or tracks 222. In such implementations, the support structure 106 can include a mechanism for keeping a mobile base unit 202 stationary when the cable positioning system is in operation. Such a mechanism can include, but is not limited to, brakes, tie downs, anchors, or a combination thereof Mobile base unit 202 implementations may also include a propulsion system to move the support structure 106.

In some implementations, the cross-members 130 are connected between the support structures 106 to provide additional structural support to the support structures 106. For example, referring to FIG. 1A, cross-members 130 can be connected between support structures 106 as shown between the two rear-most support structures 106. FIG. 1A only illustrates cross-members 130 between the two rear-most support structures 106 for simplicity, however, cross-members 130 can be connected between any of the support structures 106 to provide additional lateral structural support. In some implementations, the support structures 106 with mobile base units 202 can be connected by cross-members 130. In such implementations, the mobile base units 202 can be controlled to maneuver the entire cable-suspended robotic system 100 around an area. For example, such an implementations, may be useful in a large warehouse or in agriculture. For example, a mobile cable-suspended robotic system 100 can be navigated around a large area to perform tasks, such as moving equipment (e.g., boxes 122) around a warehouse or seeding, fertilizing, irrigation, crop inspection, livestock feeding or other agricultural operations in a pasture, orchard, or field. In such implementations, the control system 110 may be mounted on one of the support structure base units 202.

In some implementations, the support structures 106 may not be used. For example, cable control equipment 108 can be mounted to a floor or the ground and a cable support pulley 210 can be mounted to a wall or other fixed structure. For example, in cable support pulleys 210 can be mounted to walls of a warehouse and the associated cable control equipment 108 can be mounted to the floor underneath each respective pulley 210. In some implementations, depending on the weight of the cable control equipment 108 and the operational requirements of a given cable-suspended robotic system 100, the cable control equipment 108 can also be mounted on a wall near the associated pulley 210. For example, a light weight cable suspended robotic system 100 for performing plant inspections may be mounted to the walls, or even the ceiling, of a greenhouse.

Referring still to FIGS. 1A and 2, in operation, the control system 110 receives sensor data from the CPD sensors 116 can the support structure sensors 206. The control system 110 determines boundaries of the operating volume 114 based on the received sensor data. The control system 110 can also use operating limitations of the cable positioning system to determine boundaries of the operating volume 114. For example, the control system 110 can use ranging and/or image data from the support structure sensors 206 to determine the location of each support structure 106 relative to one or more of the other support structures 106. The control system 110 can determine lateral boundaries (e.g., boundaries in the x- and y-directions) based on the relative locations of the support structures 106 with respect to one and other. For example, the control system 110 can use image processing techniques to determine distances between support structures 106 from image data. The control system 110 can receive range data from ranging sensors (e.g., laser or radar range sensors) that indicates the distance between the support structures 106. For example, data from a laser ranging device can indicate the distance between one of the support structures 106 and each of the other support structures 106. The control system 110 can use such data to determine the lateral boundaries of the operating volume 114.

The control system 110 can determine the height boundaries (e.g., in the z-direction) of the operating volume 114 based on the height of the support structures 106. However, the operating height of the CPD 112 may be less than the height of the pulley's 210 on the support structures 106. For example, operating and structural characteristics of the cable-positioned robotic system 100 such as cable strength, cable weight, CPD size, CPD weight, CPD payload size and weight, support structure strength, or a combination thereof, may limit the upper boundaries of the operating volume 114. The control system 110 can further refine the operating boundaries based on such operating and structural limitations of a cable-suspended robotic system 100. For example, cable tension increases dramatically as a CPD 112 is raised within the center of an operating volume 114. Thus, the upper boundary of the operating volume 114 may "sag" below the height of the support structures 106 in the center of the operating volume 114. Furthermore, the amount of "sag" will vary depending on operational and structural characteristics of the system (e.g., weight of the CPD 112 and strength of the cables 104). The control system 110 can account for such characteristics and determine the upper operating volume 114 boundaries accordingly.

The control system 110 can be configured to generate a three dimensional (3D) model of the operating volume 114. The control system 110 can use the determined boundaries to generate a 3D model of the operating volume 114. The 3D model serves as an operating constraint on the control system 110 when navigating the CPD 112 within the operating volume 114 because the CPD 112 cannot be positioned outside of the operating volume 114 by the cable positioning system, unless the support structures are moved (e.g., in an implementation with mobile base units 202). The control system 110 can use the sensor data from the CPD sensors 116 and the support structure sensors 206 to locate objects within the operating volume 114 and correlates the object location to positions within the 3D model. For example, the 3D model can be a mathematical coordinate system for navigating the CPD 112 within the operating volume 114. The control system 110 can then navigate the CPD 112 within the operating volume 114 based on the 3D model of the operating volume 114. For example, when the control system 110 receives user input to perform a task (e.g., move one of the boxes 122 from position A to position B the control system 110 can determine a path along which to guide CPD 112 so as to prevent either the CPD 112 or one of the cables from colliding with the user 124. For example, the control system 110 may have to control the cable positioning system to raise the CPD 112 to a particular height so that the cables 104 do not collide with the user 124 while moving along the path from position A to position B. The control system 110 can control the cable control equipment 108 to move the CPD 112 along the determined path.

In more detail, the control system 110 uses the sensor data from the CPD sensors 116 and the support structure sensors 206 to locate objects within the operating volume 114. For example, the control system 110 can analyze images from the support structure sensors 206 to identify objects (e.g., shelf 120, boxes 122, and user 124) within the operating area 114. The control system 110 can use images from sensors 206 on multiple support structures 106 determine location, size, and shape of the objects. For example, the control system 110 can use image processing and object detection analyses to identify the boxes 122 in images from sensors 206 on each the support structures 106. The image from a sensor 206 on a support structure 106 on the right side of the boxes 122 will provide a different perspective of the boxes 122 than an image from a sensor 206 on a support structure 106 on the right side of the boxes 122. The control system 110 can derive different attributes of the boxes 122 from each image. The control system 110 can incorporate ranging data from the sensors 206 to triangulate the position of objects within the operating volume 114. The control system 110 can also use data (e.g., images, ranging data) from the CPD sensors 116 to further detect and locate objects within the operating volume 114.

The control system 110 also determines the position of the CPD 112 and cables 104 within the operating volume 114. The control system 110 can calculate the position of the CPD 112 and cables 104 based on the amount of each cable 104 that is deployed at a given point in time and the dimensions of the operating volume 114. More specifically, the control system 110 can receive cable length data from the equipment controller 218 of each support structure 106. The equipment controller 218 can be configured to determine length of the cable 104 based on the rotation of the spool 214. For example, the length of cable 104 payed-out can be determined based on the size of the spool 214 and the number of rotations of the spool. Furthermore, the equipment controller 218 can be configured to account for decreasing diameter of the cable on the spool 214 as the cable is payed-out. Likewise, the equipment controller 218 can account for decreases in the length of the cable 104 based on rotations of the spool 214 as the cable 104 is reeled-in and corresponding increases in the diameter of cable 104 on the spool 214. The equipment controller 218 can transmit cable length data such as estimated cable length and/or changes in cable length to the control system 110. The control system 110 can then estimate the position of the CPD 112 and the cables 104 within the operating volume 114 based on the length of each cable 104 that is deployed.

The control system 110 can use sensor data from CPD sensors 116 and the support structure sensors 206 to verify or refine the estimated position of the CPD 112 within the operating area. For example, the control system 110 can use image or ranging data from support structure sensors 206 to identify the CPD 112 within the operating volume 114 and triangulate its position. The triangulated position can be used to verify an estimated position based on the cable length data. In some implementations, the CPD sensors 116 may include position sensors, e.g., accelerometers, radiolocation sensors (e.g., triangulation based on radio waves transmitted from transmitters on the support structures 106), GPS, or other position sensors. In such implementations, the control system 110 can use data from the CPD sensors 116 to determine the position of the CPD 112 within the operating volume 114. The control system 110 can use the data from the CPD sensors 116 to refine an estimated position based on cable length or other sensors (e.g., support structure sensors 206). For example, if the cable-suspended robotic system 100 is operated in a windy environment, the wind may affect the actual position of the CPD 112 such that it is offset from a position estimate based on cable length calculations. The control system 110 can use accelerometer data from the CPD sensors 116 to adjust the estimated position to account for the effects of the wind.

In some implementations, the control system 110 may not use cable length data to determine the position of the CPD 112, but instead use only sensor data. In some implementations, the CPD 112 can be configured to determine its own position within the operating volume 114 and transmit location data to the control system 110.

The control system 110 locates the objects (e.g., 120, 122, 124), CPD 112, and the cables 104 within the 3D model. The control system 110 can use object locations, sizes, and geometries to block coordinates within the 3D model. For example, the control system 110 can designate coordinates within the 3D model that correlate with the location of an object within the operating volume 114 as navigation obstacles. Likewise, the control system 110 can correlate the locations of the CPD 112 and cables 104 to coordinates within the 3D model. The control system 110 can determine navigable paths within the operating volume 114 by calculating the geometries of the cables 104 (e.g., angles with respect to the support structures 106 and lengths) if the CPD 112 is moved to various coordinates within the 3D model. The control system 110 can, for example, avoid collisions between the CPD 112 or cables 104 and other objects within the operating volume 114 by calculating navigation paths within the 3D model that do not cause coordinate of the CPD 112 or the cables 104 to intersect with coordinates of navigation obstacles (e.g., other objects within the operating volume 114).

The control system 110 can receive user inputs that direct the operations of the cable-suspended robotic system 100. The control system 110 can be pre-programmed to perform regular tasks automatically. For example, a user 124 may provide input directing the control system 110 to perform a task or set of tasks at regular intervals. In an agricultural context, input may be provided to direct the control system 110 to control the CPD 112 to water plants in a greenhouse at regular intervals (e.g., daily). A user 124 may provide input directing the control system to perform a task upon the occurrence of a particular event. For example, in a warehouse, when boxes 122 are unloaded from a truck at a loading dock, the control system 110 can detect the boxes 122 as new objects within the operating volume 114 and navigate the CPD 112 to inspect the boxes 122. The CPD sensors 116 can include a sensor to identify the boxes 122, determine a storage location for the boxes 122 in the warehouse, and move the boxes 122 to the storage location. For example, the CPD sensors 116 can include a sensor for reading machine readable codes (e.g., RFID codes, QR codes, barcodes, or a combination thereof). The CPD 112 can scan a machine readable code on the box 122. The control system 110 can determine a location for the boxes 122 based on the machine readable code and control the CPD 112 and cable control equipment 108 to move the boxes 122 to the a designated storage location based on the machine readable code.

In some implementations, the user 124 can control the cable-suspended robotic system 100 using a computing device 126. The computing device 126 can be, for example, a mobile computing device. The computing device 126 can be, for example, a tablet computer, a smartphone, a laptop computer, a desktop computer, a joystick, or a combination thereof. The control system 110 can communicate with the computer device 126 through one or more computer networks. The computer networks can induce local area networks (e.g., WiFI, Ethernet), wide area networks (e.g., the internet), and cellular networks (e.g., 4G, LTE networks). The user 124 can provide input to the computing device 126 which can be communicated to the control system 110 to control the operation of the cable-suspended robotic system 100 in real-time. As used herein, the term "real-time" refers to receiving and processing input so as to control operations of a device, either locally or remotely, with minimal or no intended delay. For example, real-time operations may still incur some delays due to normal processing or network delays, but the inputs are processed and responded to with minimal perceptible delays to a user.

In some implementations, the cable-suspended robotic system 100 can be configured to receive user inputs through user interactions with the CPD 112. For example, user inputs can include touch or "tug" commands. For example, the CPD 112 can include touch sensors and/or accelerometers to detect user interactions with the CPD 112. User touches on different regions of the CPD 112 can indicate different commands. For example, if a user 124 pushes on the right side of the CPD 112 that may indicate that the control system 110 should move the CPD 112 towards the left side of the page (as illustrated in FIG. 1A).

In some implementations, a user may be permitted to guide the CPD 112 around the operating volume 114 by pushing or pulling the CPD 112. For example, torque or tension sensors in the spool 214 or in the motor 216 can sense pushes or pulls on the CPD 112 through the cables 104. For example, when the user 124 pushes the CPD 112 towards the left of the page (in the y-direction) the tension in the cables 104 on the right side of the page will increase and the tension in the cables 104 on the left side (e.g., the direction of the push) will decrease, thereby, producing a corresponding increase or decrease in torque on the respective motors 216. Upon receiving such data, the control system 110 can control the respective motors 216 to either reel-in cable 104 (e.g., reel-in cables 104 experiencing a decrease in tension) and pay-out cable 104 (e.g., pay-out cables 104 experiencing an increase in tension) to move the CPD 112 in the direction of the user's push. In some implementations, the CPD 112 may include an input control to indicate to the control system 110 that the user intends to push the CPD 112 to a new location. Such input control can be used to differentiate between an intended command and accidental bumps or other forces on the CPD 112 such as wind. The input control can be control string or rope attached to a pressure switch. The user 124 is pulling on the string to guide the motion of the CPD 112 and indicate that the forces on the CPD 112 due to the user's pull are intended as guidance commands.

Figure 3:
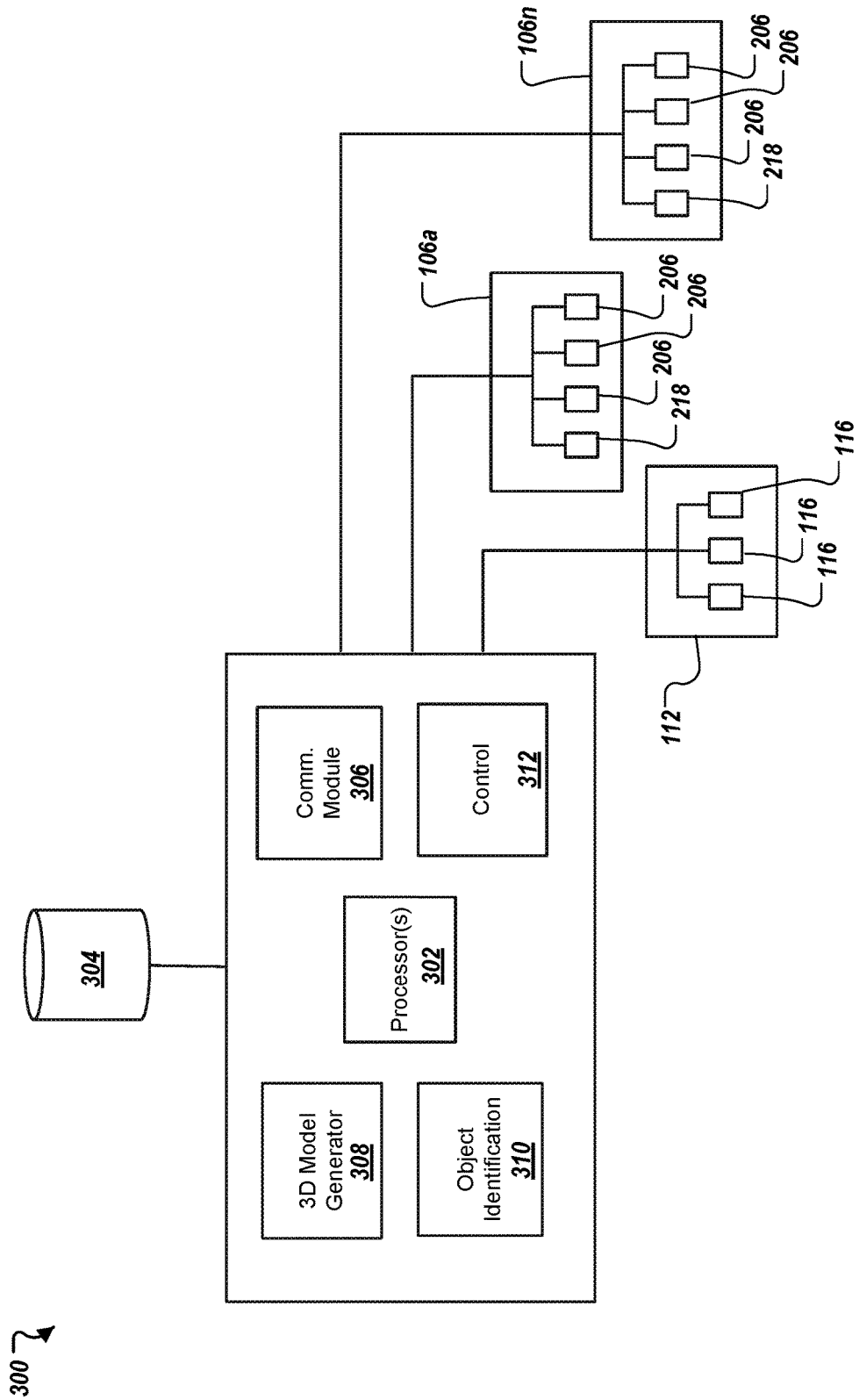
FIG. 3 is a block diagram of an example control system for a cable-suspended robotic system.

FIG. 3 is a block diagram 300 of an example control system 110 for a cable-suspended robotic system. The control system 110 includes one or more processors 302, computer readable memory 304, a communication module 306, a model generation module 308, an object identification module 310, and a navigation control module 312. The control system 110 receives data from sensors 206 from multiple support structures 106a-106n and sensors 116 from a CPD 112. In addition, the control system controls provides control commands to the CPD 112 and cable operating equipment 108 (e.g., through the equipment controller 218 of FIG. 2) of the multiple support structures 106a-106n.

The communication module 306 serves as the control system 110 interface with the support structure sensors 206, the cable operating equipment controller 218, the CPD 112 and the CPD sensors 116. The communication module 306 can be implemented as a hardware or software module of the control system 110. The communication module 306 can be can be configured to perform wired communications (e.g., Ethernet, USB, or a combination thereof), wireless communications (e.g., Bluetooth, ZigBee, WiFi, cellular communications, or a combination thereof), or both. The communication module 306 can be used to receive sensor data from the support structure sensors 206 and the CPD sensors 116 and to transmit control data to the CPD 112 and the equipment controllers 218 of the support structures 106a-106n.

The model generation module 308 obtains a 3D computer model of an operating volume for a cable-suspended robotic system. The model generation module 308 can use sensor data to generate a 3D model of the operating volume. For example, the model generation module 308 can generate a 3D coordinate map of an operating volume based on sensor data received from the support structure sensors 206, the CPD sensors 116, or both.

The model generation module 308 can generate a 3D coordinate system to map the location of the CPD 112 and other objects within operating volume. For example, the model generation module 308 can determine boundaries of an operating volume based on sensor data. For example, the model generation module 308 can use ranging and/or image data from the support structure sensors 206 to determine the location of each support structure 106a-106n relative to one or more of the other support structures 106a-106n. The model generation module 308 can determine lateral boundaries (e.g., boundaries in the x- and y-directions) based on the relative locations of the support structures 106a-106n with respect to one and other.

The model generation module 308 can determine the height boundaries (e.g., in the z-direction) of the operating volume based on the height of the support structures 106a-106n. The control system 110 can also use operating limitations of the cable positioning system to determine boundaries of the operating volume 114. For example, the operating height of the CPD 112 may be less than the height of the support structures 106a-106n. For example, operating and structural characteristics of the cable-positioned robotic system such as cable strength, cable weight, CPD size, CPD weight, CPD payload size and weight, support structure strength, or a combination thereof, may limit the upper boundaries of the operating volume. The model generation module 308 can account for such system characteristics to refine the operating boundaries based.

The model generation module 308 can load a pre-generated 3D model of an operating volume. For example, the model generation module 308 can load a previously generated 3D model from the computer readable media 304. In some examples, the model generation module 308 can download a 3D model of an operating volume from a network, e.g., from a network server.

The model generation module 308 can be provided as one or more computer executable software modules or hardware modules. For example, in some implementations, the model generation module 308 can be provided as one or more software modules. The software modules can be executed by the same computing device or distributed across multiple computing devices. In some implementations, the model generation module 308 can be provided as a hardware module in electronic communication with the processors 302.

The object identification module 310 can identify the CPD 112 and obstacles within the operating volume. The object identification module 310 analyzes the sensor data to identify and locate the CPD and various objects operating volume. The object identification module 310 can employ image recognition engines to identify objects within the operating volume. The object identification module 310 can correlate the location of objects within the operating volume to coordinates within the 3D model. For example, the object identification module 310 can analyze images from the support structure sensors 206 to identify objects within the operating area. The object identification module 310 can use images from sensors 206 on multiple support structures 106a-106n determine location, size, and shape of the objects and correlate the locations, size, and shape of the objects to coordinate sets within the 3D model. For example, the coordinates representing the location, size, and shape of an object in the operating volume can be designated as impermissible operating regions for the CPD 112 and its control cables.

The object identification module 310 can estimate the location of the CPD 112 based on cable length data as described above. The object identification module 310 can determine the location of the CPD 112 based on sensor data in a manner similar to that described above for identifying other objects. In some implementations, the object identification module 310 can use the sensor data to verify or refine the estimated location based on the cable length data. For example, the object identification module 310 may receive accelerometer data from the CPD sensors 116. The accelerometer data may indicate that the CPD 112 is in a different position from that estimated from the cable length data (e.g., due to an external force on the CPD 112 such as from wind). The object identification module 310 can refine the estimated position of the CPD 112 based on the accelerometer data to account for the effects of the external force. The object identification module 310 can also map the determined position of the CPD 112 to appropriate coordinates in the 3D model.

The object identification module 310 also can determine the positions of the cables that support the CPD 112. The object identification module 310 can also map the positions of the cables to coordinates in the 3D model, e.g., so that the control module 312 can determine movement paths for the CPD 112 along which neither the CPD 112 nor the cables will collide with the other objects within the operating volume. For example, the object identification module 310 can determine the positions of the cables based on the estimated position of the CPD 112. The object identification module 310 can calculate the positions of the cables based on the location of the CPD 112, the length of the cables and the angles of the cables with respect to the support structures 106a-106n (e.g., as illustrated in FIG. 1A).

The object identification module 310 can be provided as one or more computer executable software modules or hardware modules. For example, in some implementations, the object identification module 310 can be provided as one or more software modules. The software modules can be executed by the same computing device or distributed across multiple computing devices. In some implementations, the object identification module 310 can be provided as a hardware module in electronic communication with the processors 302.

In some implementations, the model generation module 308 and object identification module 310 update the 3D model of the operating volume regularly. For example, the 3D model can be updated in real-time to account for movements of the CPD 112 and objects (e.g., a user) within the operating volume.

The control module 312 controls the operation of the cable operating equipment 108 (e.g., through the equipment controller 218 of FIG. 2) to maneuver the CPD 112 within the operating volume. The control module 312 uses the 3D model to determine movement paths for the CPD 112 that avoid collisions between the CPD 112 and objects within the operating volume. The control module 312 can also use the 3D model to determine movement paths for the CPD 112 that avoid collisions between the cables and objects within the operating volume. The control module 312 controls the operation of the cable operating equipment 108 to maneuver the CPD 112 along the determined paths.

For example, the control module 312 can receive input requesting to move the CPD 112 from a first set of coordinates $[X_1, Y_1, Z_1]$ to a second set of coordinates $[X_2, Y_2, Z_2]$ in order to perform a task (e.g., move an object in a warehouse, water plants in a greenhouse). The control module 312 can determine an appropriate path to move the CPD 112 from the first set of coordinates to the second set of coordinates while making appropriate allowances for other objects that may be in the way of the CPD 112, the cables, or both.

For example, a direct path between the first set of coordinates and the second set of coordinates may be obstructed by another object. Therefore, the control module 312 can determine a path that navigates the CPD 112 and cables around the obstructing object, or determine a set of motions to allow the CPD 112 to, first, move the obstructing object (e.g., in a warehouse implementation). In some implementations, the second set of coordinates may be out operating volume. Therefore, in implementations with mobile support structures, the control module 312 can coordinate to move the appropriate support structures 106a-106n. For example, the control module 312 can be configured to control support structure propulsion system and/or raise/lower the height of height adjustable support structures. In addition, the control module 312 can receive feedback from the other modules (such as the object identification module 310 and/or the model generation module 308) and alter a determined path to conform to the actual motion of the CPD 112 in real-time (e.g., if the CPD's motion is affected by an external force such as wind). In other words, the control module 312 can modify a previously determined motion path based on sensor data that indicates that an actual motion of the CPD 112 has deviated from desired path.

The control module 312 can monitor the 3D model for real-time updates provided by the other modules (e.g., the object identification module 310) and adjust a determined motion path accordingly. For example, if an object (e.g., a user or a vehicle) within the operating volume moves, the object identification module 310 may update the 3D model accordingly. The control module 312 can identify that a previously determined path for the CPD 112 would then result in a collision with the object based on the object's new position as indicated in the 3D model. The control module 312 can modify the CPD path accordingly to prevent the collision. The control module 312 can then control the cable control equipment 108 to maneuver the CPD 112 along the modified path.

The control module 312 can be provided as one or more computer executable software modules or hardware modules. For example, in some implementations, the control module 312 can be provided as one or more software modules. The software modules can be executed by the same computing device or distributed across multiple computing devices. In some implementations, the control module 312 can be provided as a hardware module in electronic communication with the processors 302.

Figure 4:
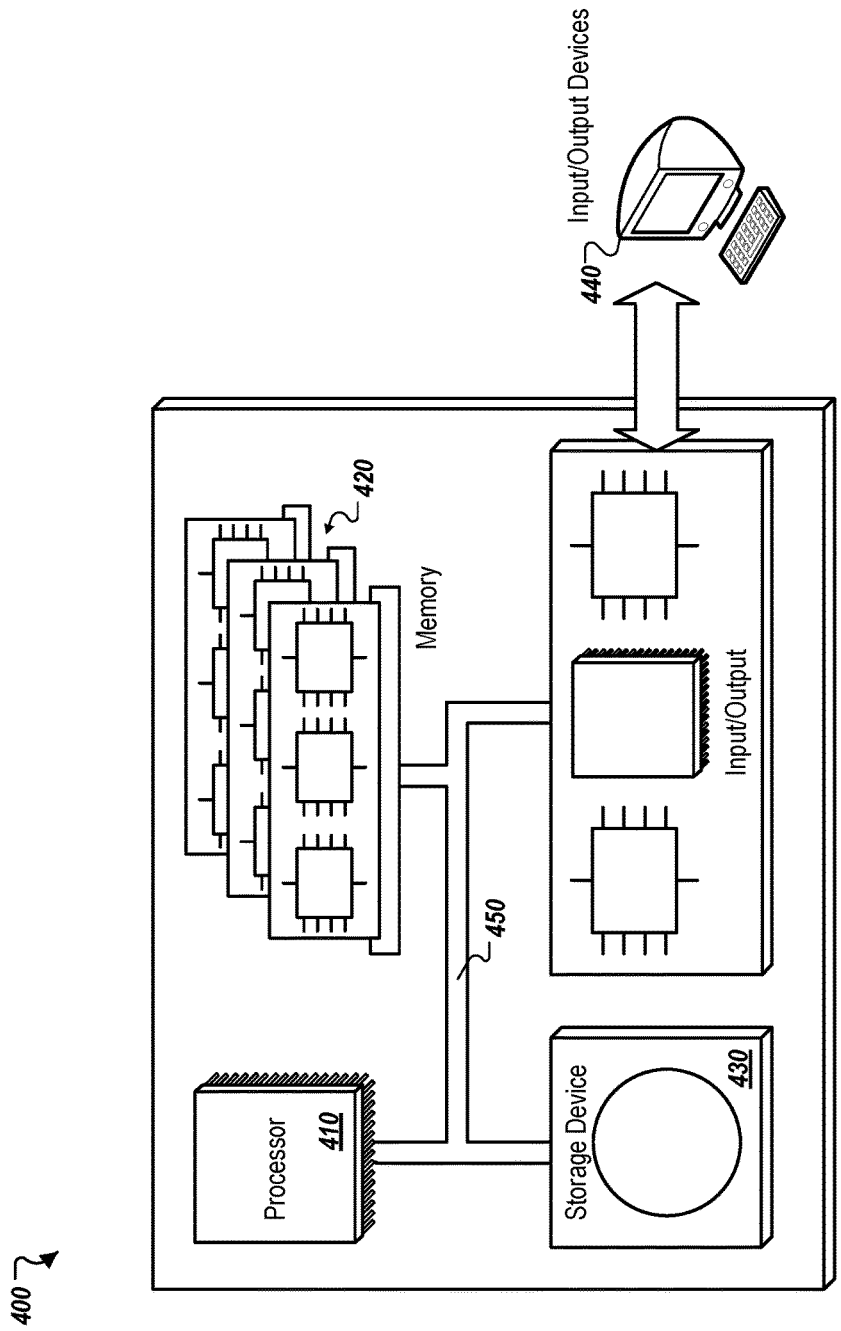
FIG. 4 depicts a schematic diagram of a computer system that may be applied to any of the computer-implemented methods and other techniques described herein.

FIG. 4 is a schematic diagram of a computer system 400. The system 400 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 400) and their structural equivalents, or in combinations of one or more of them. The system 400 is intended to include various forms of digital computers, such as laptops, desktops, workstations, personal digital assistants, servers, blade servers, mainframes, and other appropriate computers, including vehicles installed on base units or pod units of modular vehicles. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
   obtaining a three-dimensional (3D) model of an operating volume for a cable-suspended robotic system, the operating volume defined at least in part by a plurality of cable support structures, wherein the 3D model comprises a mathematical coordinate system representing the operating volume;
   identifying, within the 3D model, a position of a cable positioned device suspended from a plurality of cables;
   determining, based on data from one or more sensors, a location of an object that obstructs a path of the cable positioned device within the operating volume;
   determining the position of the cable positioned device relative to the object by correlating the location of the object within the operating volume to coordinates of the 3D model; and
   controlling one or more cable motors to navigate the cable positioned device within the operating volume.

2. The method of claim 1, wherein controlling one or more cable motors to navigate the cable positioned device within the operating volume comprises controlling one or more cable motors to navigate the cable positioned device within the operating volume while avoiding a collision between the cable positioned device and the object.

3. The method of claim 1, wherein controlling one or more cable motors to navigate the cable positioned device within the operating volume comprises controlling one or more cable motors to navigate the cable positioned device within the operating volume while avoiding a collision between at least one of the plurality of cables and the object.

4. The method of claim 1, further comprising determining a position of the cables based on a position of the cable positioned device.

5. The method of claim 1, wherein obtaining the 3D model comprises generating a 3D model of an operating volume based on images of the operating volume.

6. The method of claim 1, wherein obtaining the 3D model comprises generating a 3D model of an operating volume based on ranging data of ranges between the cable support structures.

7. The method of claim 1, further comprising:
   determining that the path for the cable positioned device will result in collision with the object; and
   modifying the path of the cable positioned device to avoid the object, wherein a modified path is generated.

8. The method of claim 7, wherein controlling the one or more cable motors to navigate the cable positioned device comprises controlling the one or more cable motors to navigate the cable positioned device along the modified path to perform an action with the cable positioned device.

9. The method of claim 1, wherein the cable support structures are mobile cable support structures that can be controlled to move independently of each other to reconfigure the operating volume, the method further comprising:
   controlling at least one of the cable support structures to move to a new position; and
   obtaining a second 3D model of the operating volume in response to the at least one of the cable support structures having been moved.

10. The method of claim 1, wherein the operation volume is defined by relative positions of the cable support structures and operational limits of the cable-suspended robotic system.

11. The method of claim 10, wherein lateral dimensions of the operating volume are defined by relative positions of the cable support structures and vertical dimensions of the operating volume are defined by operational constraints of the cables.

12. The method of claim 1, wherein obtaining the 3D model comprises loading a previously generated 3D model of the operating volume.

13. The method of claim 1, further comprising detecting a user input to move the cable positioned device to a new location based on receiving data indicating changes in tension in one or more of the plurality of cables.

14. A cable-suspended robotic system comprising:
   a plurality of spools, each spool containing deployable cable;
   at least one spool motor coupled to each spool of deployable cable, each spool motor coupled to a respective motor controller;
   a cable positioned device coupled to one end of each of the deployable cables; and
   a control system in communication with the motor controllers, the control system comprising one or more processors and a data store coupled to the one or more processors having instructions stored thereon which, when executed by the one or more processors, causes the one or more processors to perform operations comprising:
      obtaining a three-dimensional (3D) model of an operating volume for the cable positioned device, the operating volume defined at least in part by a plurality of cable support structures, wherein the 3D model comprises a mathematical coordinate system representing the operating volume;
      identifying, within the 3D model, a position of the cable positioned device suspended from the deployable cables;
      determining, based on data from one or more sensors, a location of an object that obstructs a path of the cable positioned device within the operating volume;
      determining the position of the cable positioned device relative to the object by correlating the location of the object within the operating volume to coordinates of the 3D model; and
      controlling one or more of the motor controllers to navigate the cable positioned device within the operating volume.

15. The system of claim 14, wherein controlling one or more of the motor controllers to navigate the cable positioned device within the operating volume comprises controlling one or more of the motor controllers to navigate the cable positioned device within the operating volume while avoiding a collision between the cable positioned device and the object.

16. The system of claim 14, wherein the operations further comprise determining a position of the deployable cables based on a position of the cable positioned device.

17. The system of claim 14, wherein obtaining the 3D model comprises generating a 3D model of an operating volume based on ranging data of ranges between the cable support structures.

18. The system of claim 14, wherein the operations further comprise:

determining that the path for the cable positioned device will result in collision with the object; and modifying the path of the cable positioned device to avoid the object, wherein a modified path is generated.

19. The system of claim 18, wherein controlling the one or more of the motor controllers to navigate the cable positioned device comprises controlling the one or more of the motor controllers to navigate the cable positioned device along the modified path to perform an action with the cable positioned device.

20. A non-transitory computer readable storage medium storing instructions that, when executed by at least one processor, cause the at least one processor to perform operations comprising:

obtaining a three-dimensional (3D) model of an operating volume for a cable-suspended robotic system, the operating volume defined at least in part by a plurality of cable support structures, wherein the 3D model comprises a mathematical coordinate system representing the operating volume;

identifying, within the 3D model, a position of a cable positioned device suspended from a plurality of cables;

determining, based on data from one or more sensors, a location of an object that obstructs a path of the cable positioned device within the operating volume;

determining the position of the cable positioned device relative to the object by correlating the location of the object within the operating volume to coordinates of the 3D model; and controlling one or more cable motors to navigate the cable positioned device within the operating volume.

* * * * *